US009051961B1

(12) United States Patent
Ayrest

(10) Patent No.: US 9,051,961 B1
(45) Date of Patent: Jun. 9, 2015

(54) HOLE ADAPTER INSERT FOR LOCK MOUNTING

(71) Applicant: Robert B. Ayrest, Placerville, CA (US)

(72) Inventor: Robert B. Ayrest, Placerville, CA (US)

( * ) Notice: Subject to any disclaimer, the term of this patent is extended or adjusted under 35 U.S.C. 154(b) by 25 days.

(21) Appl. No.: 14/150,130

(22) Filed: Jan. 8, 2014

(51) Int. Cl.
*A47B 95/04* (2006.01)
*F16B 43/00* (2006.01)

(52) U.S. Cl.
CPC ..................................... *F16B 43/00* (2013.01)

(58) Field of Classification Search
CPC .................................................. B60R 16/0222
USPC ......... 16/2.1, 2.2, 2.3; 70/375, 404, 423, 450, 70/452
See application file for complete search history.

(56) References Cited

U.S. PATENT DOCUMENTS

| | | | | |
|---|---|---|---|---|
| 2,275,362 | A * | 3/1942 | Golden et al. | 70/134 |
| 3,102,412 | A * | 9/1963 | Christopher | 70/491 |
| 3,251,205 | A * | 5/1966 | Kerr | 70/491 |
| 3,261,188 | A * | 7/1966 | Kerr | 70/491 |
| 4,012,928 | A * | 3/1977 | Dauenbaugh | 70/81 |
| 5,063,765 | A * | 11/1991 | Squire et al. | 70/417 |
| 5,144,777 | A * | 9/1992 | Fishel et al. | 52/144 |
| 5,488,198 | A * | 1/1996 | Kramer | 174/507 |
| 5,627,342 | A * | 5/1997 | Kramer | 174/656 |
| 5,806,139 | A * | 9/1998 | Anderson et al. | 16/2.1 |
| 6,372,986 | B1 * | 4/2002 | Saeki et al. | 174/651 |
| 6,573,450 | B2 * | 6/2003 | Saito et al. | 174/665 |
| 6,640,592 | B2 * | 11/2003 | Vickers | 70/83 |
| 6,843,082 | B2 * | 1/2005 | Vickers | 70/83 |
| 7,165,427 | B1 * | 1/2007 | Lai | 70/159 |
| 7,388,156 | B2 * | 6/2008 | Knagge | 174/152 G |
| 7,401,484 | B1 * | 7/2008 | Holmes et al. | 70/423 |
| 2009/0071209 | A1 * | 3/2009 | Lurie | 70/391 |

* cited by examiner

*Primary Examiner* — Roberta Delisle
(74) *Attorney, Agent, or Firm* — Howard Cohen

(57) ABSTRACT

A hole adapter insert for modifying a circular hole to mount a D/DD lock body securely in a rotationally fixed manner includes a disk-like body having a cylindrical outer surface received in the circular hole. A bore extending axially through the body is provided with the requisite standard D/DD cross-sectional profile to receive a standard, complementarily-formed lock body. Extending radially from one end of the body is an annular flange having a proximal face adapted to be glued to the annular surface about the exterior of the circular hole. Alignment flats at the periphery of the flange enable proper D/DD angular alignment of the lock body. A cam lock body is inserted through the outer end of the bore of the insert and secured by a lock nut threaded onto the lock body at the inner end thereof.

14 Claims, 3 Drawing Sheets

HOLE ADAPTER INSERT FOR LOCK MOUNTING

CROSS-REFERENCE TO RELATED APPLICATIONS

Not applicable

FEDERALLY SPONSORED RESEARCH

Not applicable.

SEQUENCE LISTING, ETC ON CD

Not applicable.

BACKGROUND OF THE INVENTION

1. Field of the Invention

This invention relates to arrangements for mounting locks and latches and, more particularly, to adapting a circular mounting hole to secure a standard D or double D lock body.

2. Description of Related Art

In the field of locks and latches, there are a great number of products that are used to secure doors, panels and cabinets in low security situations; that is, settings in which there is a need to maintain a closure against casual or incidental opening, but no requirement to resist intentional breaking and entering. A common lock for such uses is a cam lock, in which a lock armature has an arm, or cam extending radially therefrom and arranged to pivot into engagement with a fixed structural element adjacent to a cabinet door, or panel. One consummate example of a cam lock is described in U.S. patent application Ser. No. 13/889,215, filed May 7, 2013 by this inventor. The disclosure of that patent application is incorporated herein by reference. In addition, standard cam locks that are secured by threaded nuts in a mounting hole are also encompassed by this invention.

Most lock bodies are provided with a D, or double D outer configuration (hereinafter, "D/DD") in which the mostly-cylindrical lock body has one flat side, or two opposed flat sides, respectively. These exterior features are known in the prior art, and are provided to engage a similarly formed D or double D mounting hole having a complementary configuration, so that the engagement of the flat sides in the non-circular mounting hole resists torque applied to the lock by the repeated turning of the key in the lock. In high volume manufacturing it is relatively easy to set up tooling to form a D/DD mounting hole. However, in lower volume numbers it is necessary to cut with a laser beam, water jet, or punch tool to form the D/DD opening, which can add expense to production costs. Punch cannot be used for plastic panel without fracturing the material.

One solution in the industry is to use a simply-formed circular hole, and secure the lock body therethrough with a lock nut and lock washer which are tightened to create sufficient friction to immobilize the lock body. It is a fact that many cabinets and closures are fabricated of plastic or polymer panels, and these locks are being installed through holes in such panels. It is necessary to severely tighten the lock nut to effect a secure installation, but too much compression from the lock nut may damage the plastic panel. Furthermore, lock bodies, which are often fabricated of brass or steel, are much harder that the plastic panel material, and over time the panel will wear against the harder material and the lock will loosen in its mount and begin to yield in angular turning movement when the key is rotated in the lock body.

BRIEF SUMMARY OF THE INVENTION

The present invention generally comprises a hole adapter insert for modifying a circular hole to mount a D/DD lock body securely in a rotationally fixed manner. The hole adapter is comprised of a disk-like body having a cylindrical outer surface and a bore extending axially therethrough. The bore is provided with the requisite standard D/DD cross-sectional profile to receive a standard, complementarily-formed lock body. The body is dimensioned to be inserted in and received through a circular hole that may be drilled or milled through a plastic panel or the like. Extending radially from one end of the body is an annular flange having a proximal face that may be provided with MicroDot™ surface treatment. The proximal face may be glued or solvent-bonded to the plastic panel, and the MicroDot surface optimizes that bonding interface. The distal surface of the flange forms the distal end surface of the adapter, and comprises a smooth annular land for securing a lock nut. A pair of diametrically opposed, parallel alignment flats are formed in the periphery of the annular flange The insert is employed by first inserting the adapter through a drilled or milled circular hole with the flange at the inside end of the hole, and securing the adapter by applying adhesive or solvent to the proximal face of the flange before it is impinged on the surface of the panel in which the hole is formed. The alignment flats are used in conjunction with a carpenter's square or installation fixture to align the D/DD feature of the bore as required. After the insert is bonded in place, a D/DD cam lock body with the cam portion removed is inserted through the outer end of the bore of the insert, and secured therein by a lock nut threaded onto the lock body at the inner end thereof. The cam portion is then reassembled to the inner end of the lock armature and the installation is complete.

It may be appreciated that the D/DD complementary features of the adapter bore and lock body not only align the lock body at the requisite angle for the cam to engage its stop or strike. Also, these complementary features prevent any rotation of the lock with respect to the adapter. The torque thus applied to the lock insert is distributed to the flange thereof, and through the large bonded surface of the proximal face of the flange to the panel in which the lock is mounted. Thus it is not necessary to tighten the lock nut severely, since its primary function is to retain the lock axially in the adapter, not to generate friction to resist torque from the lock body. As a result the lock mounting in the hole adapter is more secure and less likely to cause any damage to the plastic panel that supports the lock.

The hole adapter may be produced in a series of outside diameters and inside D/DD hole sizes to accommodate common lock body dimensions and corresponding drill bit sizes.

DETAILED DESCRIPTION OF THE INVENTION

Figure 1:
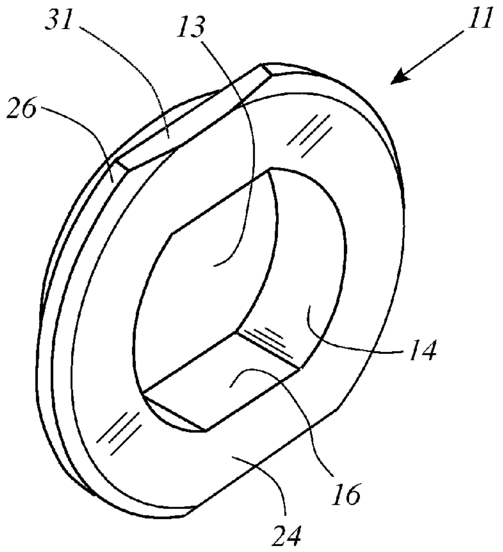
FIG. 1 is a perspective elevation view of the hole adapter insert for lock mounting of the present invention.
Figure 2:
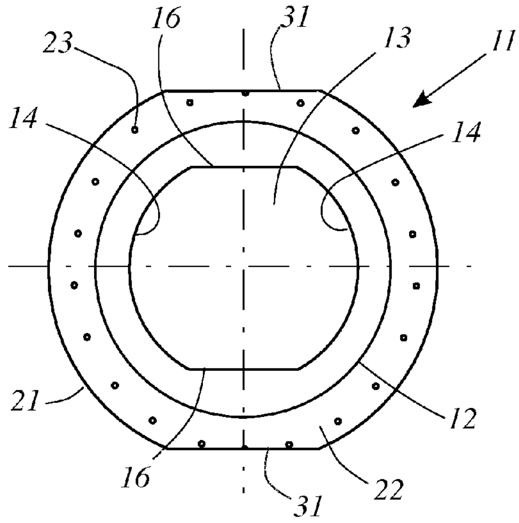
FIGS. 2 and 3 are proximal and distal end views of the hole adapter insert of FIG. 1.
Figure 3:
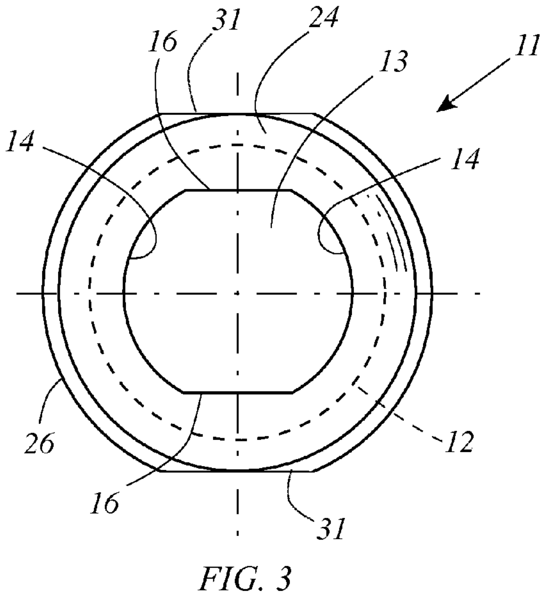
Figure 4:
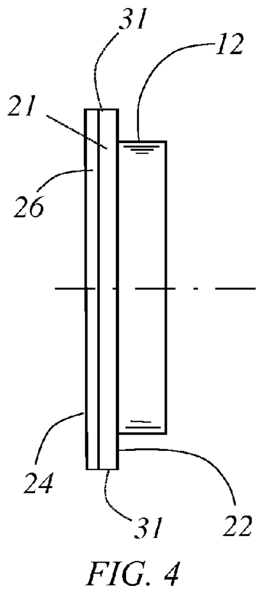
FIG. 4 is a side elevation of the hole adapter insert shown in FIGS. 1-3.
Figure 5:
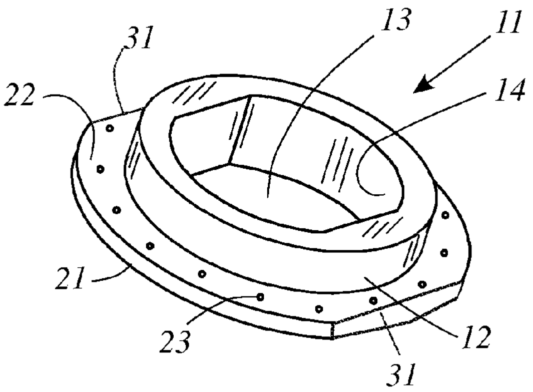
FIG. 5 is a perspective view of the proximal end of the hole adapter insert of FIGS. 1-4.
Figure 6:
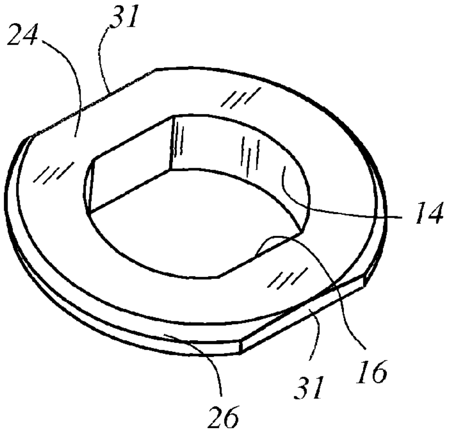
FIG. 6 is a top perspective view of the hole adapter insert of the invention.

The present invention generally comprises a hole adapter insert for modifying a circular hole to mount a D/DD lock body securely in a rotationally fixed manner. With regard to FIGS. 1-6, the hole adapter insert 11 includes a disk-like body 12 having a cylindrical outer peripheral surface that is adapted to be received in a lock mounting hole that is also cylindrical and dimensioned with a complementary diameter. A bore 13 extends axially through the body 12, and includes a pair of diametrically opposed curved sidewall portions 14 that are sections of a common cylindrical, joined by a pair of chordally extending sidewall portions 16 that are generally planar, diametrically opposed, and parallel each to the other. The planar sections 16 are disposed to engage the opposite flats of a standard double-D lock body construction that is well known in the prior art, so that a lock body received in bore 13 cannot rotate with respect to the insert 11 about the axis thereof.

Note that although a bore for a double-D lock body is shown and described herein, it is within the scope of the invention to provide only one of the flat wall sections 16 to accommodate the single-D lock body configuration that is also well known in the prior art.

The hole insert 11 further includes a flange 21 extending radially outwardly from the distal end of the body 12. The flange 21 defines an annular face 22 facing toward the proximal end of the insert 11, and a MicroDot™ surface treatment 23 is applied to the face 22 to facilitate glue/solvent bonding to the surface of a plastic or polymer material. The distal extend of flange 21 is coextensive with the distal end face 24 of the insert 11. The distal end face 24 provides an annular land to engage and seat a cooperatively engaged nut and washer, as described below. A chamfer 26 is formed at the outer edge of flange 21. It may be noted that in the preferred embodiment depicted herein the axial depth of the body portion 12 is somewhat more that the axial depth of the flange 21, and the overall axial length is small, which is sufficient extend through a panel or wall of a drawer, cabinet, or the like. The axial length may be selected to suit the overall thickness of the structural component that will be supporting the lock, as described below.

The insert 11 also includes a pair of alignment flats 31 formed in the periphery of the flange 21. Each of the flat 31 form a chord in the periphery of the flange 21, and extend in parallel, diametrically spaced-apart fashion. Notably, the alignment flats 31 are aligned in a fixed, predetermined angular relationship with the internal flats 16 of the D/DD bore. In this example the flats 31 extend parallel to the flats 16, but any convenient angular relationship may be established by design.

Figure 7:
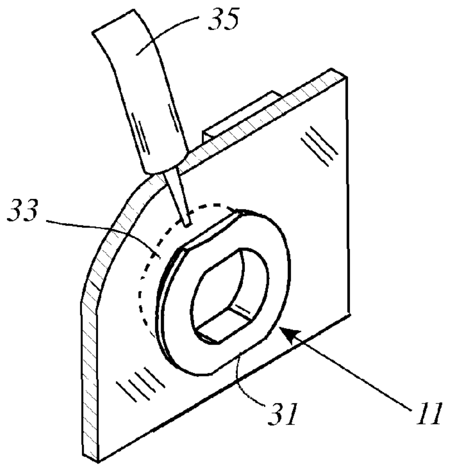
FIG. 7 is a perspective view showing the preliminary step of applying adhesive or bonding materials to a panel to secure the hole adapter insert either way in a lock mounting hole.
Figure 8:
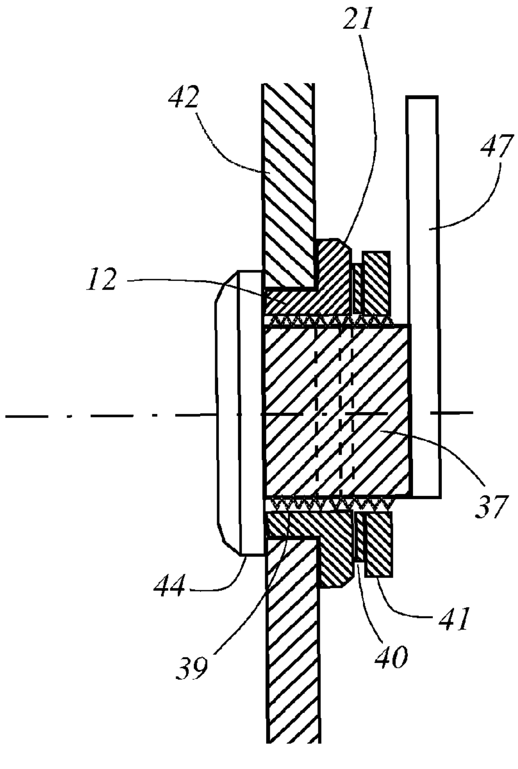
FIG. 8 is a cross-sectional elevation of a cam lock installed with a hole adapter insert according to the invention.
Figure 9:
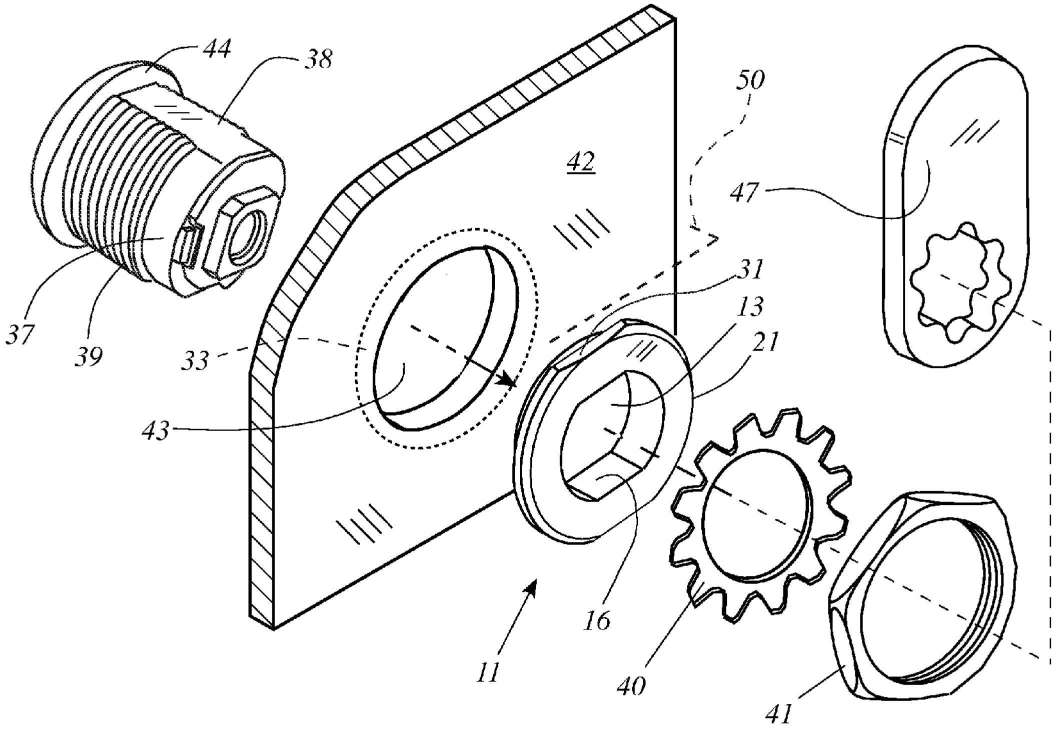
FIG. 9 is an exploded perspective view showing the assembly process for securing a cam lock in a circular lock mounting hole using the hole adapter insert of the invention.

The preferred method for employing the hole adapter insert of the invention is described with reference to FIGS. 7-9. As shown in FIG. 9, a typical cam lock 36 may include a lock body 37 having a cylindrical outer configuration provided with a pair of flat chordal sides 38 in a double-D configuration known in the prior art. The body 37 is also provided with external male threads 39 that are adapted to engage a lock nut 41, and a distal flange 44 that is disposed to impinge on the surface adjacent to its mounting aperture. To install the lock 36 in a panel or wall component 42 or the like, a lock mounting hole 43 is formed in the panel 42 using a laser cutter, water jet cutter, punch, or the like. The cylindrical hole 43 is unsuitable for securing the lock body 37 by itself, due to the fact that the cylindrical hole lacks any geometric features that would prevent rotation of the lock body about the common axis.

To modify the hole 43 as an optimum lock mounting hole, the hole adapter insert 11 is employed as follows. The annular area 33 surrounding the interior end of hole 43 receives an application of adhesive 35 or solvent, as shown in FIG. 7, or the material is applied directly to the surface 22 of flange 21. The alignment flats 31 are used in conjunction with a carpenter's square or installation fixture (broken line 50, FIG. 9) or the like to align the D/DD feature of the bore 13 as required. The proximal end of the insert 11 is inserted into the interior opening of the hole 43, the cylindrical body 12 occupying the hole 43 in a close tolerance fit. The adhesive/solvent 35 bonds the surface 22 to the annulus 33 surrounding the exterior of hole 43, permanently securing the adapter in the hole and preventing rotation of the insert 11.

The lock 36 is prepared by removing the arm or cam 47, and inserting the proximal end of the lock body 37 through the outer end of opening 13 of adapter 11, with the flats 38 of the lock body aligned with the chordal surfaces 16 of the bore 13. Note that the prior alignment of the insert 11 using the alignment flats 31 assures that the lock body is in proper angular alignment for the cam 47 to pivotally engage a strike or other fixed structure. Lock nut 41 is then engaged on threads 39 (typically with a lock washer 40) and tightened to secure the lock by clamping action in combination with flange 44 of the lock in opposition to flange 21 of the hole adapter insert 11, as shown in FIG. 8. The arm or cam 47 is then re-engaged on the proximal end of the armature of the lock, as shown in FIGS. 8 and 9, and the installation is complete and the lock is ready to be used.

Note that the nut 41 secures the lock in fixed axial position, but the hole adapter insert provides the primary resistance to rotational movement of the lock. Therefore the nut need not be tightened more than hand-tight, thus protecting the panel 42 from damage due to over-tightening and over-compression. Moreover, the body 12 of the insert 11 protects the inner surface of hole 43 from the external threads 39 of the lock body. These threads, formed in the hard metal (brass or steel) of the lock body, may abrade the softer plastic or polymer material of the panel 42 if they are allowed to come in contact with the inner surface of the mounting hole. However, the interposition of the body 12 between the lock body and the mounting hole isolates the threads from the panel and eliminates a significant source of material wear. At the same time the opposed annular flanges 21 and 44 and the body sidewall 12 reinforce the panel in the area surrounding the hole 43, which is otherwise a locus for stress concentration in the panel.

The hole adapter insert 11 may be fabricated by injection molding, stamping, machining, or additive (3D) printing techniques. Furthermore, the insert 11 may be used in a reverse position by installing the insert with the flange 21 abutting the exterior surface of the panel 42, if the situation requires it.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A hole adapter for modifying a circular hole to accept a non-circular lock component, including:

a hole insert having a disk-like body portion having an outer cylindrical surface extending about an axis and formed in complementary fashion to the circular hole and adapted to extend therethrough;

a flange extending radially outwardly from a distal end of said body portion, said flange having an annular proximal face disposed to impinge on an annular surface extending about the circular hole;

a bore extending axially through said body portion, said bore having a cross-sectional configuration that is complementary to a D or double-D lock component extending axially therethrough, whereby said hole adapter rotationally immobilizes the lock component.

2. The hole adapter of claim 1, further including adhesive means applied to said annular surface about the circular hole to secure said annular proximal face of said flange.

3. The hole adapter of claim 1, further including adhesive means applied to said annular proximal face to secure said flange to said annular surface about the circular hole.

4. The hole adapter of claim 1, wherein said lock component comprises a lock body, and further including external threads formed on said lock body, and a lock nut threadedly secured to said external threads to secure said lock body in combination with said flange of said hole adapter.

5. The hole adapter of claim 4, further including a cam extending radially from a proximal end of a lock armature extending axially through said lock body.

6. The hole adapter of claim 4, wherein said bore extending axially in said disk-like body portion defines a closed curved sidewall that is interposed between said external threads of said lock body and the interior surface of the circular hole.

7. The hole adapter of claim 1, wherein said flange includes a distal face that is coextensive with the distal end of said hole adapter, said distal face comprising an annular land for receiving a threaded nut of said lock component.

8. A method for mounting a D or double-D lock in an object, including the steps of:

drilling a circular mounting hole in the object;

providing a hole adapter having a disk-like body portion having an outer cylindrical surface extending about an axis and formed in complementary fashion to the circular hole and adapted to extend therethrough, and having a flange extending radially from a distal end of said body portion, and a bore extending axially through said body portion, said bore having a cross-sectional configuration that is complementary to a D or double-D lock component extending axially therethrough, inserting and securing said disk-like body portion of said hole adapter in the proximal opening of the circular mounting hole;

inserting said lock through the proximal opening of the bore in D or double D complementary alignment so that a portion of said lock abuts said flange, and securing a lock nut on threads on said lock to secure said lock in said hole adapter.

9. The method of claim 8, further including the step of applying adhesive to secure a proximal portion of said flange to an annular surface on said object extending about said circular mounting hole.

10. The method of claim 8, wherein the lock is a cam lock, and further including the step of attached a cam to a proximal portion of the lock after said lock nut is secured to the lock.

11. The method of claim 8, further including the step of providing at least one alignment flat in a peripheral portion of said flange, said at least one alignment flat having a predetermined angular orientation with respect to said complementary configuration of said bore to enable proper angular installation of said hole adapter.

12. The method of claim 9, further including a pair of said alignment flats provided in parallel relationship and extending chordally in their respective peripheral portions of said flange.

13. A hole adapter for modifying a circular hole to accept a non-circular lock component, including:

a hole insert having a disk-like body portion having an outer cylindrical surface extending about an axis and formed in complementary fashion to the circular hole and adapted to extend therethrough;

a flange extending radially outwardly from a distal end of said body portion, said flange having an annular proximal face disposed to impinge on an annular surface extending about the circular hole;

a bore extending axially through said body portion, said bore having a cross-sectional configuration that is complementary to a D or double-D lock component extending axially therethrough, whereby said hole adapter angularly orients and rotationally immobilizes the lock component; and, at least one alignment flat formed in a peripheral portion of said flange and having a predetermined angular orientation with respect to said complementary D or double-D configuration of said bore to enable proper angular installation of said hole adapter.

14. The hole adapter of claim 13, further including a pair of said alignment flats disposed in parallel relationship and extending chordally in their respective peripheral portions of said flange.

* * * * *